United States Patent [19]
Pradt et al.

[11] 3,907,678
[45] Sept. 23, 1975

[54] SPLIT AIR STREAM BEFORE AND AFTER THE HEAT EXCHANGER IN A WET OXIDATION PROCESS

[75] Inventors: Louis A. Pradt, Wausau; Wayne B. Gitchel, Rothschild, both of Wis.

[73] Assignee: Sterling-Winthrop Research Institute, Rensselaer, N.Y.

[22] Filed: Apr. 11, 1974

[21] Appl. No.: 460,093

Related U.S. Application Data
[63] Continuation-in-part of Ser. No. 323,205, Jan. 12, 1973, abandoned.

[30] Foreign Application Priority Data
Jan. 8, 1974  United Kingdom............... 00844/74

[52] U.S. Cl. ................................................. 210/63
[51] Int. Cl.² ......................................... C02C 5/04
[58] Field of Search ........... 210/63, 61, 50, 71, 175, 210/177; 203/8

[56] References Cited
UNITED STATES PATENTS
| | | | |
|---|---|---|---|
| 3,060,118 | 10/1962 | Schoeffel | 210/63 |
| 3,359,200 | 12/1967 | Gitchel et al. | 210/63 |
| 3,655,343 | 4/1972 | Galeano | 210/63 |

*Primary Examiner*—Thomas G. Wyse
*Assistant Examiner*—Benoit Castel
*Attorney, Agent, or Firm*—Charles R. Fay

[57] ABSTRACT

A wet oxidation system including an air stream for treating an organic containing aqueous stream which is characterized by a tendency to polymerize when heated in the absence of air, the improvement being in splitting the air stream, part of the air being added before the heat exchanger and the remainder of the air being added after the heat exchanger, the division of the air being determined to be that amount which is necessary to be added before the heat exchangers to prevent polymerization.

1 Claim, 3 Drawing Figures

3,907,678

SPLIT AIR STREAM BEFORE AND AFTER THE HEAT EXCHANGER IN A WET OXIDATION PROCESS

This application is a continuation-in-part of Ser. No. 323,205, filed Jan. 12, 1973, and now abandoned.

BACKGROUND OF THE INVENTION

In conventional wet air oxidation systems the waste stream to be oxidized passes through a heat exchanger in the substantial absence of oxygen and is then mixed with air as it enters the oxidation reactor. Certain waste products, particularly those from the plastic, fiber, coating and related industries, contain organic compounds which when heated in the absence of air readily form polymers that separate as a sticky material which adheres to the walls of the pipes and vessels, thereby fouling and plugging the pipes and heat exchangers, eventually rendering the system inoperable. Such polymerizable organic compounds include monomers such as acrylonitrile, butadiene and styrene, byproducts from the polymerization thereof, and starting materials for condensation polymerizations, for example, phenols and aldehydes.

The undesirable polymerization of waste products can be prevented by heating them in the presence of air, the oxygen content of which cleaves the unsaturated bonds or otherwise inactivates the organic molecules susceptible to polymerization. However, in a wet oxidation system, if the air is added before the waste stream enters the heat exchanger, a substantial degree of oxidation will take place in the heat exchanger, thereby creating a disadvantageous thermodynamic situation.

If substantial amounts, e.g., 50 percent of the oxidation occurs in the heat exchanger, then 50 percent of the temperature difference will appear in the heat exchanger, thus reducing the temperature difference across the heat exchanger. In the extreme case where all the oxidation occurs in the heat exchanger, there is no temperature difference across the heat exchanger and therefore the heat exchanger becomes completely inutile.

It is the principal object of the present invention to prevent the above described polymerization from occurring while still retaining a sufficient temperature difference across the reactor and therefore across the heat exchanger.

SUMMARY OF THE INVENTION

It is known that a small degree of oxidation will change the chemical character of the organic material so that polymerization will not occur. In this invention the air stream is split so that part of the air is added prior to the heat exchanger and the rest of the air after the heat exchanger, i.e., relative to the reactor. There will then be sufficient air along with the organic material in the heat exchanger to prevent polymerization and still a small enough amount of air so that the temperature increase in the heat exchanger due to oxidation is minimal. The amount of air necessary to prevent polymerization is determined and added to the stream before the heat exchanger, and the remainder of the air is added after the stream leaves the heat exchanger.

PREFERRED EMBODIMENT OF THE INVENTION

Figure 1:
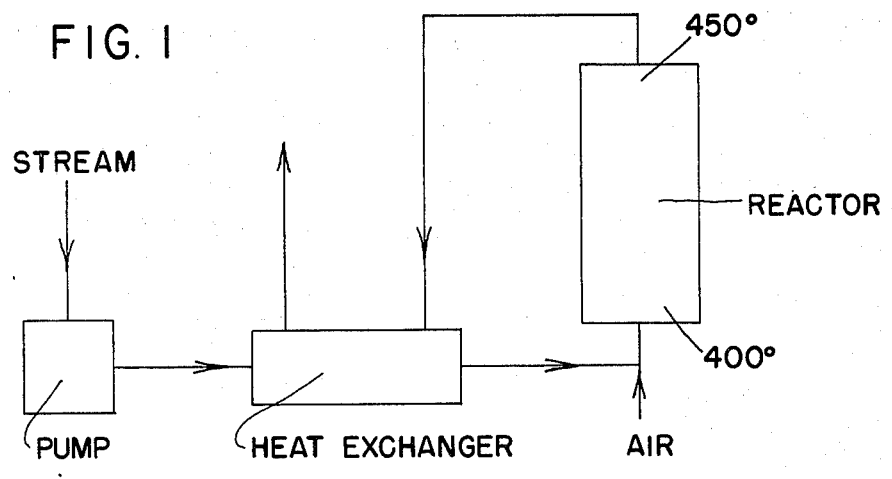
FIG. 1 illustrates a situation in which the air is inserted in the stream as it enters the reactor from the heat exchanger.

Referring now to FIG. 1, the air enters the stream at the inlet end or bottom of the reactor and the oxidation produces a fifty degree Fahrenheit temperature rise from the bottom of the reactor to the top of the reactor. If the temperature at the bottom of the reactor is e.g., 400° F., the temperature at the top of the reactor is 450° F.

This same temperature difference is obtained across the hot end of the heat exchanger where this temperature difference is also measured substantially from top to bottom of the reactor.

In this case the organic material treated polymerizes and fouls the system, plugging pipes, etc., and the heat exchangers, and renders the system inoperable.

Figure 2:
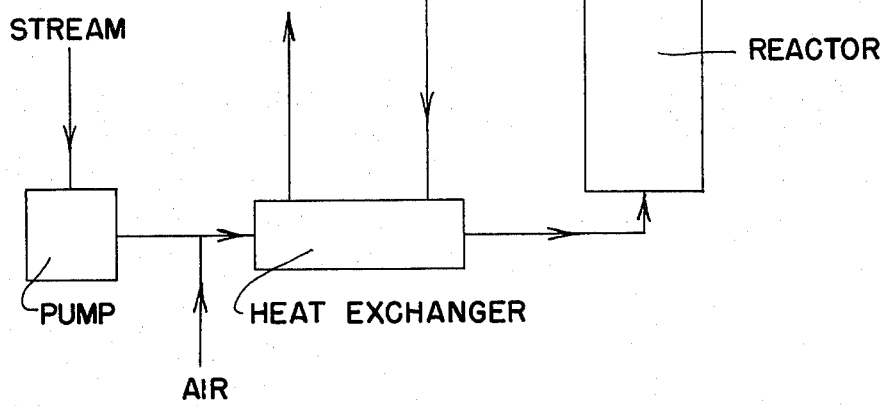
FIG. 2 is a similar view illustrating the air inserted in the stream before the heat exchanger.

In the flow sheet of FIG. 2, a substantial amount, say fifty percent of the oxidation occurs in the heat exchanger because the air enters the system before the stream enters the heat exchanger, and then fifty percent of the temperature difference will appear in the heat exchanger. Using the above example, the temperature at the bottom of the reactor would be e.g., 425° and at the top 450°. It will be recognized that the temperature difference across the hot end of the heat exchanger has been reduced by fifty percent from 50°F to 25°F. and the necessary heat exchange area would have to be doubled. In an extreme case where all of the oxidation occurs in the heat exchanger, there is no temperature difference across the heat exchanger and the heat exchanger would have to become infinitely large.

Figure 3:
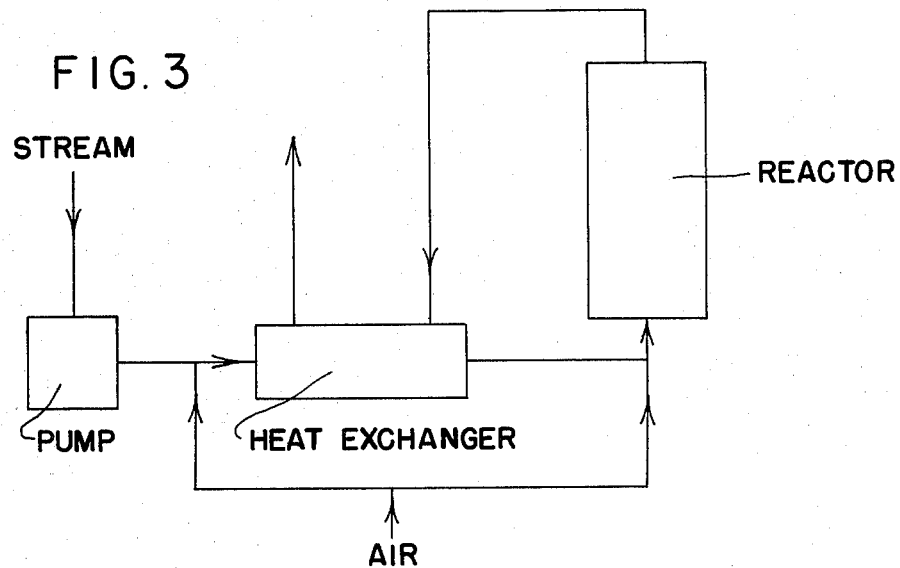
FIG. 3 illustrates the present invention wherein the air stream is split, part flowing into the system prior to the heat exchanger and part after the heat exchanger.

However by utilizing the present invention, FIG. 3, which splits the air, providing some air in the system prior to the heat exchanger and some further air into the system after the heat exchanger directly into the reactor, there will then be sufficient air along with the organic material in the heat exchanger to prevent polymerization; but this is still a relatively small amount of air so that the temperature increase in the heat exchanger due to oxidation will be minimal. Only the amount of air necessary to prevent polymerization is added before the heat exchanger and the entire remainder of the air is added after the heat exchanger.

The necessary amount of air can be determined as follows: A sample of the waste material is heated in an autoclave with a known amount of air. The air is then removed and the partially oxidized sample is heated again in the absence of air. If upon reheating in the absence of air, polymerization occurs, then the above experiment is repeated, increasing the amount of air. If no polymerization occurs, then the amount of air is decreased. This procedure is continued until the amount of air necessary to prevent polymerization is determined, and the wet air oxidation system can then be operated accordingly.

Alternatively, the minimum amount of air necessary to prevent polymerization can be calculated if the identity and concentration of substances subject to polymerization in the waste material are known or determined by analysis.

The following examples will further illustrate the invention.

EXAMPLE I

Analysis of a waste of 50 g/l total oxygen demand shows that one-half or 25 g/l of the oxygen demand is contributed by acrylonitrile and the balance of the oxygen demand is due to various nonpolymerizing organics. Since the total oxygen demand of acrylonitrile is 226% of its weight, the 25 g/l oxygen demand is equal to 11.0 g/l acrylonitrile. The compound is partially oxidized to non-polymerizing substances according to the following equation:

$$2CH_2\!\!=\!\!CHCN + 4O_2 \longrightarrow 2CH_3COOH + 2CO_2 + N_2$$

The oxygen requirement for this equation is 120% of the acrylonitrile weight. Therefore 11 × 1.2 = 13.2 g/l oxygen used is sufficient to eliminate polymerization. This is 26.4% of the total (50 g/l) needed to completely oxidize the organic substances in the waste. Therefore by directing 26.4% of the air to the heat exchanger oxidation sufficient for suppressing polymerization could be obtained. In a complete oxidation, at least 36.8 g/l of oxygen is directed to the reactor whereby 73.6% of the heat of reaction is obtained in the reactor.

EXAMPLE II

A waste is comprised of equal molecular proportions of phenol and formaldehyde. The phenol concentration is 21 g/l which contributes 50 g/l total oxygen demand. The equivalent weight of formaldehyde is 6.69 g/l which contributes 7.1 g/l total oxygen demand. The total mixture therefore has 57.1 g/l total oxygen demand.

Partial oxidation of formaldehyde to formic acid eliminates condensation polymerization.

$$2CH_2O + O_2 \longrightarrow 2HCOOH$$

This reaction only requires 50% of the total oxygen demand of the formaldehyde or 3.6 g/l. This is 6.3% of the 57.1 g/l total. In this case it is only necessary to pass 6.3% of the air to the heat exchanger, leaving 93.7% to go to the reactor.

We claim:

1. In a wet air oxidation system comprising a heat exchanger and oxidation reactor, a method for treating a fluid stream containing organic substances characterized by a tendency to polymerize when heated in the absence of oxygen, which comprises determining the minimum amount of oxygen necessary to oxidize the polymerizable substances to non-polymerizable form, adding to said fluid stream prior to entering the heat exchanger air containing said minimum amount of oxygen, and adding to said fluid stream after leaving the heat exchanger and prior to or upon entering the reactor additional air sufficient to meet the remaining oxygen demand of said fluid stream.

* * * * *

UNITED STATES PATENT OFFICE
CERTIFICATE OF CORRECTION

PATENT NO. : 3,907,678
DATED : September 23, 1975
INVENTOR(S) : Louis A. Pradt and Wayne B. Gitchel It is certified that error appears in the above-identified patent and that said Letters Patent are hereby corrected as shown below:

Cover page, [73] Assignee: "Sterling-Winthrop Research Institute, Rensselaer, N.Y." should read --Sterling Drug Inc., New York, N.Y.--

Signed and Sealed this sixth Day of January 1976

[SEAL]

Attest:

RUTH C. MASON
Attesting Officer

C. MARSHALL DANN
Commissioner of Patents and Trademarks